May 19, 1936.   Q. J. SCHWARZ   2,041,377
MANUFACTURE OF CORK ARTICLES
Filed Dec. 5, 1935
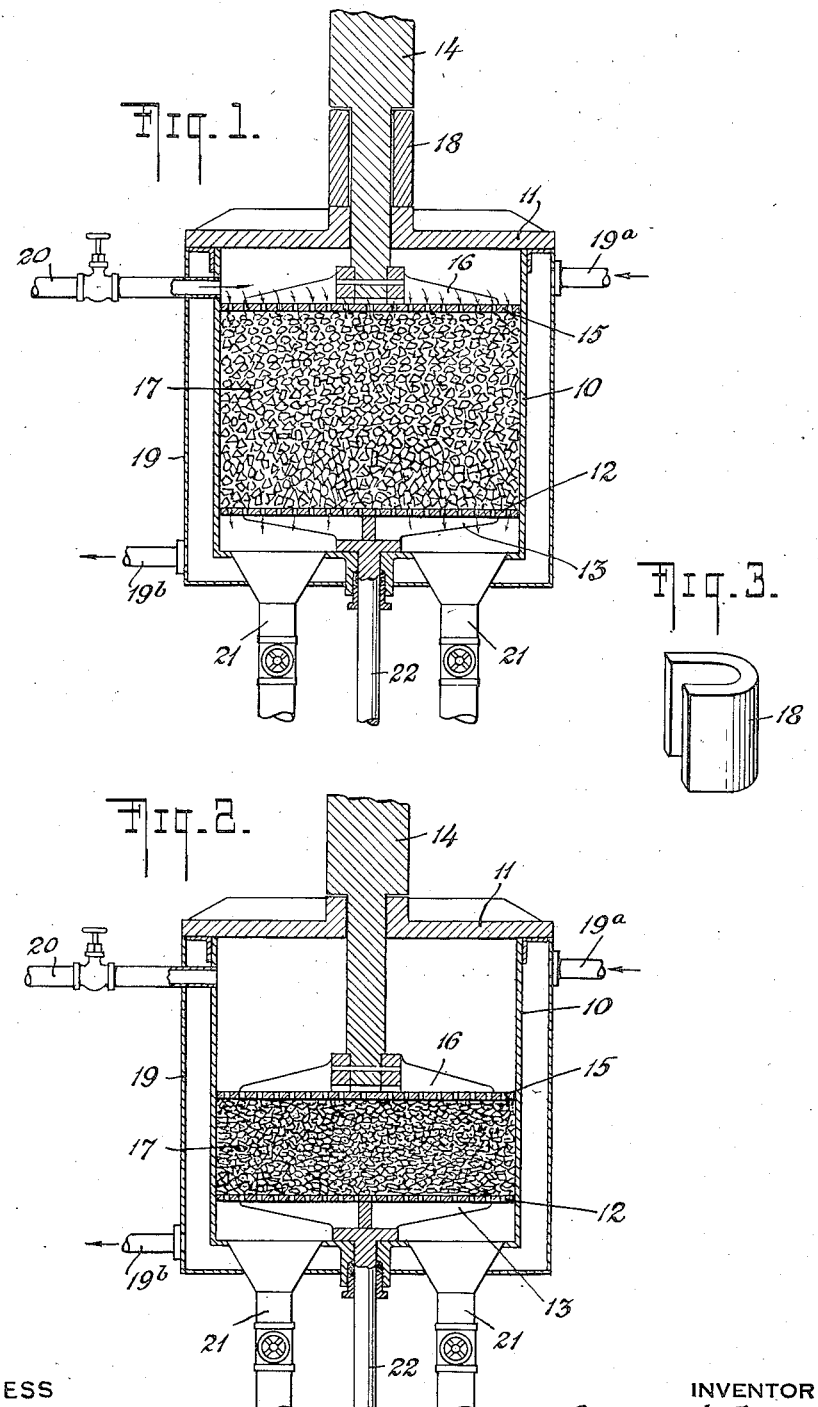
WITNESS
INVENTOR
QUIRIN J. SCHWARZ
BY
ATTORNEYS Patented May 19, 1936

2,041,377

UNITED STATES PATENT OFFICE 2,041,377

MANUFACTURE OF CORK ARTICLES

Quirin J. Schwarz, Rutherford, N. J., assignor to United Cork Companies, Lyndhurst, N. J., a corporation of Delaware Application December 5, 1935, Serial No. 52,999

3 Claims. (Cl. 18—48)

My invention relates to the manufacture of cork blocks, sheets, etc., for use as flooring, as insulators against heat, sound, etc., for forming foundations for machinery to absorb the vibrations thereof, and for other purposes.

Cork blocks and sheets are usually made of what is known as "cork waste", that is, the waste material resulting from the manufacture of cork stoppers, bungs, gaskets, bottle cap discs and similar articles, and from so-called forest trimmings, that is, so much of the cork bark as is not deemed suitable for the manufacture of stoppers and similar articles; also low grade cork bark, virgin cork and second stripping cork. This waste is usually ground to pass a mesh of approximately ½ to ¾ of an inch, and is then graded, by subsequent screenings, to obtain a proper selection of sizes adapted to produce an efficient agglomeration in the finished article; the resulting particles are manufactured into blocks and sheets, usually by exposing them to heat and also to pressure.

Various methods are in use for the production of blocks and sheets from waste cork. They are substantially the following:

*Method No. 1.*—The cork particles are charged into a mold and compressed while in such mold, and, while the particles remain under pressure, the mold is subjected to heat exteriorly applied, for instance, by placing the mold into a bake oven until the resins which are natural to the cork are liquefied and have been liberated. The particles are then cooled until the resins have hardened sufficiently to form an effective bond between the particles. See, for instance, patent to Smith, No. 456,068, July 14, 1891.

*Method No. 2.*—A non-oxidizing gas, for instance, superheated steam, is passed through a loose aggregation of cork particles so as to liquefy and liberate the resins and carry away any excess of resins over that needed, or desired, as a subsequent bonding agent, then subjecting the particles to compression until the aggregate has the shape of the desired product, and permitting them to cool, the rehardened resins forming a bond uniting the particles. This is one of the methods disclosed by patent to Grünzweig, No. 997,056, July 4, 1911; see also article in Kork-Industrie-Zeitung, November 15, 1932, page 171 et seq. Patent to Champney No. 1,917,361, July 11, 1933, discloses this method.

*Method No. 3.*—The cork particles are placed into a mold and are therein compressed by pressure externally applied (as distinguished from pressure produced by an expansion of cork particles under the influence of heat), and a non-oxidizing gas, such as superheated steam, is passed through the compressed mass, some expansion of the cork particles taking place. Other things being equal, more pressure and heat have to be applied than in Method No. 2, to liquefy and liberate the resins, the residue of which, after cooling, acts as a bond, as in Methods Nos. 1 and 2. As the cork, prior to the baking operation, has been compressed to the desired shape of the finished article and retained therein, no subsequent pressure is employed. See patent to Bertelsen, No. 1,607,047, November 16, 1926.

During the process of baking by means of superheated steam or other non-oxidizing gas, passed through the mass of cork particles (as distinguished from application of heat from the exterior only), a substantial proportion of the resins is, or may be, removed by being volatilized and then carried off by the gas. It is of advantage to remove surplus resins, among other reasons because they are better heat conductors than is the cork tissue, but in my opinion one of the important functions in the baking, and especially that of baking with the aid of superheated steam penetrating the mass of particles, is to soften and otherwise change the nature of the cork particles so as to render them more pliable than natural cork. It has, however, heretofore been necessary to leave at least some of the resins within the mass to act as a bonding agent.

My process differs from those of Methods No. 2 and No. 3 in that, on the one hand, I do not leave the cork particles loose during the treatment with a non-oxidizing gas (superheated steam), and on the other hand, I do not subject them to any pressure exteriorly applied (as distinguished from pressure due to the expansion of the cork itself), or at least to any substantial degree of such pressure, during the treatment with such gas. I charge the cork particles into a mold, then confine them within a fixed space, substantially that normally occupied by the mass of loosely piled particles, preferably applying no more pressure than sufficient to give assurance that the particles are as closely confined as possible without, however, themselves being subjected to any substantial degree of pressure by the confining means. I then pass a non-oxidizing gas (preferably superheated steam) through the mass of cork particles, thereby obtaining the advantage, already known to the art, of subjecting the cork particles to a baking process, simultaneously removing the resins, while the cork particles are relatively loose. As the baking (steaming) process proceeds, with the resultant removal of resins, the cork particles gradually expand, the whole mass then being subjected to a pressure created internally, and not applied from the exterior. After the cork has become sufficiently pliable, and after the desired proportion of resins has been removed, the flow of heating gases is stopped, and the resulting aggregate compressed, preferably while still hot, and preferably in the same mold, to the desired degree of density. This density may be that of the desired finished article; it may, however, be a density less than that of the desired article because I may, after removing the mass from the mold, and preferably while it is still hot, subject it to further pressure, thus reducing the thickness, and increasing the density, of the product. Preferably I do not permit expansion of the cork particles after the flow of heating gases has been stopped and before compressing to the desired form. After compression I may, and preferably do, continue the baking operation by applying heat to the exterior of the mold, which heat, added to the heat in the aggregate, completes the baking operation.

As already indicated, one of the principal functions of the baking process is to condition the cork particles, so as to render them more pliable than natural cork. The baking operation should proceed until the distillation of the gaseous and volatizable components of the cork has been completed, and the resultant cork particles are sufficiently pliable so that they will take a set. The cork, in order to be properly baked, should be heated gradually until it has attained a temperature of about 350° to 400° F. or more, the temperature depending somewhat upon the nature of the cork as is well known to those skilled in the art; at the same time the moisture content is vaporized and the resin content liquefied. I could, should I so desire, complete the baking operation during the first stage of my process, that is, while the superheated steam is passing through the cork particles; it is, however, substantially essential to hold the cork particles, while under compression in the second stage of my process, for a sufficient length of time to permit the cork particles to acquire a set, the time depending largely upon the size and form of the compressed mass—for instance, perhaps about 15 minutes for a block 3 feet square and one foot thick. As the cork is hot, it is more practicable to complete the baking operation in such second stage, thus utilizing the heat already within the cork, adding a little heat from the exterior, if this should prove necessary or desirable. I therefore stop the passage of steam through the mass or, in other words, complete the first stage of my process, preferably when the cork has reached such a stage of pliability that the baking process would be completed substantially with the aid of the heat already in the cork, if such cork were compressed.

It is a manner of comparative indifference whether all, or substantially all, of the resins are removed, or only so much thereof as are removed in Methods No. 2 and No. 3, as I do not depend to any substantial degree, if at all, upon securing a strong adhesion between the particles by a bond formed by rehardened resins. On the contrary, by my process the cork particles are caused to adhere closely and firmly, not by something in the nature of an adhesive or bonding material, but by a change in the physical rearrangement of the cork particles. It is probable that the exterior portions of each particle, as they expand, interlock with the exterior portions of adjoining particles, such interlocking becoming more pronounced as the loosely interlocked particles are subjected, first to internal compression by expansion of the cork and thereafter by the mechanically applied compression. It is also possible, and quite probable, that the air chambers of the exterior portions of each cork particle are ruptured by reason of the expansion of the enclosed air, and act as suction cups when pressed into contact with adjoining particles similarly provided on their exterior surfaces with ruptured air chambers. It is well known that even a small piece of cork contains myriads of small air cells. Any substantial release of pressure, after the flow of the heating medium has been stopped, would tend to disturb the physical arrangement just described, and it is for this reason that I prefer not to permit such expansion. As resins are better conductors of heat and sound than the porous cork, it is of advantage to remove them so far as possible.

As it is my purpose to have the cork particles, at the beginning of my process, very closely confined, without, however, being subjected to pressure exteriorly applied, so that, as the cork particles expand, their surfaces may full interlock, I find it desirable to remove the air contained between the cork particles (as distinguished from the air held within the air cells of the particles) so as to bring the surfaces of such particles into as close juxtaposition as possible. I therefore preferably subject the mass of cork particles to one or two more compressions (prior to confining it closely, as hereinabove described), just sufficient to force out as much of the contained air as feasible without, however, causing any permanent compression of the cork particles. After each such preliminary compression, I remove all exterior pressure, thus permitting the cork mass to expand freely as a whole. It should be clearly understood that the purpose of this operation is merely to get rid of the air so far as possible without, however, causing the aggregate to become, at least to any substantial degree, a compressed mass.

As I do not depend for adhesion upon the cooled resins, I may remove the compressed aggregate from the mold promptly, that is, while such aggregate is still hot. If the bonding of the particles depends entirely, or almost entirely, upon the resins, it would be necessary to leave the compressed mass of cork particles in the mold until the mass has cooled and the resins have set, the mold being therefore not available during such time for use in preparing a new block or slab of cork. This fact alone enables me to make a very large saving, either in time or of apparatus, or both. Moreover, as the particles are firmly compressed, there is substantially no danger of smouldering or burning when the hot aggregate is first exposed to contact with the oxygen of the atmosphere.

In order to hasten the cooling, I may cut the aggregate immediately into slabs, or may immediately subject the mass, after removal from the mold, and either with or without first cutting the same into slabs, to further compaction if a denser board is desired, for instance, for use in machine foundations, or as a flooring material.

The baking of the particles, and their compression, may be performed in any suitable apparatus which includes a mold, apertures and other means for passing superheated steam through the mold, and means for holding the unbaked cork particles closely confined while the baking process is carried on, and means for compressing the baked particles. By way of illustration only, the drawing accompanying this specification shows one type of apparatus which could be used for this purpose, it being clearly understood that the particular form of the apparatus is immaterial, provided it is adapted for carrying on the steps hereinabove described.

In such drawing, Figs. 1 and 2 show a vertical section of one type of apparatus, Fig. 1 showing it before compression is applied, and Fig. 2 after compression has been applied, to the mass of cork particles; and Fig. 3 shows a spacer. A container, 10, (circular or rectangular in cross-section) having a cover 11 is provided near its bottom with a foraminated plate 12 resting upon a spider 13, the plate 12 and so much of the container 10 as extends above the same, forming a mold. A plunger 14, carrying at its lower end a foraminated plate 15 and spider 16, extends through an aperture in the cover 11. After the mold has been charged with cork particles 17, the plunger carrying the spider and foraminated plate, the spider in turn carrying the cover 11, is lowered until the parts assume the position shown in Fig. 1. The plate 15 may then be pressed down, once or twice, upon the cork particles to squeeze out as much as possible of the air contained between them. A stop (for instance, the horseshoe stop 18) is then put in place, as shown in Fig. 1, to prevent further downward movement of the plunger, the cover 11 being in position.

In the preferred form of my invention, the cork particles are not subjected to any compression by the plate 15 while the stop 18 is in position, but such plate 15 serves merely to confine the cork particles closely.

The container is provided with an exterior jacket 19 into which a hot gas, preferably hot air because of its cheapness, is introduced by any suitable means, for instance, through pipe 19$^a$, and exhausts through pipe 19$^b$. Pipe 20 extends through the jacket and into the mold for the purpose of supplying a non-oxidizing gas, for instance, superheated steam, which, as indicated by the arrows, passes through the mass of particles from the top to the bottom, escaping through relief pipes 21—21.

After the first step of my process has been completed and the flow of non-oxidizing gases through pipe 20 has been discontinued, the stop 18 is removed and the plunger depressed until the parts assume the position shown in Fig. 2. After the baking operation has been completed, the plunger 14 is raised until spider 16 has carried the cover 11 away from the top of the container 10 a distance sufficiently far to permit the removal of the compressed mass of cork. To facilitate this removal, the spider 13, which rests loosely upon the bottom of container 10, is raised by means of a rod 22 until the upper portion of plate 12 is at least flush with the top of the container 10.

Among the advantages of my process is that I obtain a more uniform product, the high uniformity resulting in a higher thermal efficiency, whether or not a greater proportion of the resins has been removed than in Methods 2 and 3. My process permits the removal, if desired, of substantially all of the resins or, in any event, of a higher proportion of the resins, than heretofore deemed desirable or necessary and, as already indicated, the lower the proportion of resins the higher the thermal efficiency of the product. Because of the interlocking of the surfaces of the particles, I do not have to depend upon the resins as binders, and may therefore more quickly remove the completed product from the mold, for cooling, instead of waiting until the resins have at least partially hardened, thus shortening the time during which a mold has to be in use for the purpose of forming a cork block.

Various details of my process may be modified without departing from the spirit of my invention. Moreover, a mere slight departure from the optimum conditions hereinabove described would still be within the spirit of my invention.

I claim:

1. The method of treating a mass of particles of natural cork, which consists in closely confining such mass within a treating chamber, without exerting any substantial degree of external pressure thereupon, passing a hot non-oxidizing gas through the mass of particles, while the volume of the mass is maintained substantially constant, until the desired proportion of resins has been removed therefrom and the cork has been conditioned, and then compressing such mass while still confined within said chamber.

2. In the method claimed in claim 1, continuing the compression of such mass until its constituent particles have become set.

3. In the method claimed in claim 1, continuing the passage of hot gas through the mass until substantially all of the resins is removed.

QUIRIN J. SCHWARZ.